United States Patent [19]

Pitz et al.

[11] Patent Number: 5,708,495
[45] Date of Patent: Jan. 13, 1998

[54] METHOD AND APPARATUS FOR DETERMINING THE VELOCITY OF A GAS FLOW

[75] Inventors: Robert W. Pitz, Nashville, Tenn.; Peter A. DeBarber, Laguna Beach, Calif.; Thomas M. Brown, III, Nashville, Tenn.

[73] Assignee: Vanderbilt University, Nashville, Tenn.

[21] Appl. No.: 522,943

[22] Filed: Sep. 1, 1995

[51] Int. Cl.$^6$ .................. G01P 3/36; G01P 15/00; G01P 5/18

[52] U.S. Cl. .......... 356/28; 73/514.26; 73/861.05; 250/356.1

[58] Field of Search ............ 73/861.05, 514.26; 356/28; 250/356.1

[56] References Cited

U.S. PATENT DOCUMENTS

| | | | |
|---|---|---|---|
| Re. 34,265 | 5/1993 | Foster et al. | 356/28 |
| 3,623,361 | 11/1971 | Funk, Jr. | 73/147 |
| 3,829,694 | 8/1974 | Goto . | |
| 4,033,185 | 7/1977 | McNally | 73/147 |
| 4,317,178 | 2/1982 | Head | 364/510 |
| 4,417,584 | 11/1983 | Cathignol et al. | 128/663 |
| 4,859,055 | 8/1989 | Gal et al. | 356/28 |
| 4,925,296 | 5/1990 | Reichmuth | 356/28 |
| 4,989,969 | 2/1991 | Siebert | 356/28 |
| 5,000,566 | 3/1991 | Kuppenheimer et al. | 356/28 |
| 5,011,278 | 4/1991 | Farrell | 356/28 |
| 5,131,741 | 7/1992 | Zweben | 356/28 |
| 5,153,665 | 10/1992 | Weinstein | 356/28 |
| 5,223,763 | 6/1993 | Chang | 310/339 |
| 5,249,238 | 9/1993 | Komerath et al. | 382/1 |

OTHER PUBLICATIONS

R. Miles, C. Cohen, J. Connors, P. Howard, S. Huang, E. Markovitz, G. Russell; Opt. Letter 12, 861 (1987). "Velocity Measurements by Vibrational tagging and fluorescent probing of oxygen".

R.B. Miles, J.J. Connors, E.C. Markovitz, P.J. Howard, G.J. Roth; Exp. Fluids 8, 17 (1989). "Instantaneous profiles and turbelance statistics of supersonic free shear layers by Raman excitation plus laser-included electronic fluorescence velocity, tagging of oxygen".

L.R. Boedecker, Opt. Lett. 14, 473 (1989). "Velocity Measurement by $H_2O$ photolysis and laser–induced fluorescence of OH".

*Primary Examiner*—Stephen C. Buczinski
*Attorney, Agent, or Firm*—Waddey & Patterson; Edward D. Lanquist, Jr.

[57] ABSTRACT

A method and apparatus for measuring the velocity of a gas flow that does not require the seeding of the flow is disclosed. The method and apparatus produce a population of stable molecules within the flow. This population of stable molecules is produced within the flow at a first time point. A population of excited molecules is produced from the stable molecules at a second time point by exciting the stable molecules with a laser beam. This laser beam also induces fluorescence in the population of excited chemical species at the second time point. Typically, the interval between the first and second time points is known and the velocity of the flow is calculated by dividing the distance travelled by the stable molecules in the flow by the known time interval. The preferred example of the stable molecule is ozone. Oxygen molecules are fluoresced by a 193 nm laser beam at a first time point, producing oxygen atoms. Ozone is also generated in the flow with a 193 nanometer laser beam through the reaction of these oxygen atoms and molecules at the first time point. A population of excited oxygen molecules can be produced from the ozone and can be subsequently fluoresced by a 248 nanometer laser at a second time point. The velocity of the flow is determined by measuring the distance between the first and second fluorescence events and dividing this distance by the known time interval between the two time points. Since ozone is formed rapidly within the flow and is stable, both high and low speed flows can be measured using the method and apparatus of this invention.

47 Claims, 11 Drawing Sheets

METHOD AND APPARATUS FOR DETERMINING THE VELOCITY OF A GAS FLOW

UNITED STATES LETTERS PATENT

Be it known that we, Robert W. Pitz, a citizen of the United States, residing at 3921 Brighton Road, Nashville, Tenn. 37205, Peter A. DeBarber, a citizen of the United States, residing at 969 Skyline Drive, Laguna Beach, Calif. 92651, and Thomas M. Brown, III, a citizen of the United States, residing at 2601 Hillsboro Road, Nashville, Tenn. 37212, have invented a new and useful "Method and Apparatus for Determining the Velocity of a Gas Flow".

This work was supported by the U.S. DOD Phase I SBIR Program (Arnold AFB Contract #F40600-94-C-0007). The Government has certain rights in this invention.

BACKGROUND OF THE INVENTION

The present invention relates generally to flow velocimetry and more particularly to determining the velocity of an unseeded flow by inducing fluorescence of chemical species within the flow.

It will be appreciated by those skilled in the art that molecular velocity methods that do not require seeding are advantageous for wind tunnels and propulsion test facilities. Many velocity measurement techniques such as laser Doppler velocimetry (LDV), particle image velocimetry (PIV), and planar Doppler velocimetry (PDV) measure the MIE scattered light from particles or aerosols in the flow.[1-3] In these methods, foreign particles are often added to the air flow. In large facilities, flow seeding is costly and environmentally unsatisfactory. Also at high speeds, the particles do not faithfully reproduce the gas flow.

Gas phase Doppler shift velocity methods have been developed using laser-induced fluorescence (LIF) and Rayleigh scattering.[4-5] In LIF techniques, chemical species such as iodine, hydroxyl, nitric oxide, and copper atoms are excited and the Doppler shift of absorbed or scattered light is measured. However, none of these chemical species are normally present in air-supplied wind tunnels. Also at lower velocities, Doppler shift methods are inaccurate.

Unseeded tagging methods have been reported previously that produce chemical or excited state tags in the flow and measure velocity by the time-of-flight ($\Delta t$) of the tagged line.[6-8] In the RELIEF method, vibrationally excited $O_2$ ($v''=1$) is produced by stimulated Raman scattering.[6,7] The tagged line is imaged at a later time with an ArF excimer laser. However in humid air flows, the vibrationally excited oxygen is rapidly quenched by water vapor and the method is best suited for higher speed flows where $\Delta t<10$ µs. Thus in moist air, the method is best suited for high speed flows.

An OH flow tagging method has also been reported where a KrF excimer laser photodissociates water vapor and produces a line of OH.[8] However, the OH tagging method relies on the presence of water vapor in the air. This method requires a 1% or greater water vapor concentration and thus is not attractive for velocity measurements of gas flows with low water vapor concentration.

What is needed, then, is a method and apparatus for measuring the velocity of an air flow that does not require seeding of the flow and that utilizes a tagging system that can be formed quickly within the flow and is also stable within the flow so that both high and low speed flows can be analyzed. This method and apparatus are presently lacking in the prior art.

SUMMARY OF THE INVENTION

It is an object of this invention to provide a method and apparatus for determining the velocity of a gas flow that does not require the seeding of the gas flow.

It is a further object of this invention to provide a method and apparatus for measuring the velocity of a gas flow that includes the production of a stable molecule within the flow.

It is yet another object of this invention to provide a method and apparatus for measuring the velocity of a gas flow wherein the production of a stable molecule within the flow occurs quickly. Both high and low speed flows can be analyzed by using such a stable molecule.

Still another object of this invention is to provide a method and apparatus for measuring the velocity of a gas flow wherein a population of excited chemical species is produced from the stable molecules that are formed within the flow and wherein the population of excited chemical species is then fluoresced, preferably with a laser beam.

Yet another object of this invention is to provide a method and apparatus for measuring the velocity of a gas flow wherein the steps of producing a population of excited chemical species from the stable molecules that are formed within the flow, and fluorescing the population of excited chemical species, are performed with the same laser beam.

Accordingly, the method of this invention comprises the steps of producing a population of stable molecules within the flow at a first location at a first time point; producing a population of excited chemical species within the flow by exciting the stable molecules; inducing fluorescence in the population of excited chemical species at a second time point; detecting a fluorescence event of the population of excited chemical species at a second location at a second time point; and calculating the velocity of the gas flow by dividing a distance between the first and second locations by an amount of time elapsed between the first and second time points.

Preferably, the steps of producing a population of excited chemical species within the flow by exciting the stable molecules and inducing fluorescence in the population of excited chemical species are performed with a laser beam. More preferably, these steps are performed with the same laser. An example of the wavelength for this laser beam is 248 nm.

An example of a stable molecule is ozone. In the preferred embodiment of the invention the method comprises the steps of exciting a first population of oxygen chemical species within the flow with a first laser beam to induce fluorescence in the first population of excited oxygen chemical species; obtaining a location of the first population of excited oxygen chemical species within the flow by detecting the fluorescence of the first population of excited oxygen chemical species at a first time point; producing ozone molecules from the first population of excited oxygen chemical species; producing a second population of excited oxygen chemical species by exciting the ozone molecules with a second laser beam at a second time point; inducing fluorescence in the second population of excited oxygen chemical species with the second laser beam at the second time point; obtaining a location of the second population of excited oxygen chemical species within the flow by detecting the fluorescence of the second population of excited oxygen chemical species at the second time point; and calculating the velocity of the gas flow by dividing a distance between the location of the first population of excited oxygen chemical species and the location of the second population of excited oxygen chemical species by an amount of time elapsed between the first and second time points. The preferred wavelength for the first laser is 193 nm.

The apparatus for measuring velocity of a gas flow of this invention comprises means for producing a population of stable molecules at a first location within the flow at a first time point, the means for producing a population of stable molecules located near an origin of the flow; means for producing a population of excited chemical species in the flow by exciting the stable molecules; means for inducing fluorescence in the population of excited chemical species at a second location at a second time point; means for detecting a fluorescence event of the population of excited chemical species at the second location at the second time point.

The apparatus can further comprise means for calculating the velocity of the gas flow by dividing the distance between the first and second locations by an amount of time elapsed between the first and second time points. The means for producing a population of stable molecules within the flow can comprise a laser beam generating means, means for producing an electrical arc, an ultraviolet lamp, or an ozone generator.

The means for producing a population of excited chemical species in the flow by exciting the stable molecules and the means for inducing fluorescence in the population of excited chemical species at a second time point can comprise the same means. This means can be a single laser beam generating means.

The means for producing a population of excited chemical species in the flow by exciting the stable molecules and the means for inducing fluorescence in the population of excited chemical species at a second time point can comprise separate laser beam generating means.

The apparatus can further include means for establishing the amount of time elapsed between the first and second time points as a fixed interval.

DESCRIPTION OF THE PREFERRED EMBODIMENT

Figure 1:
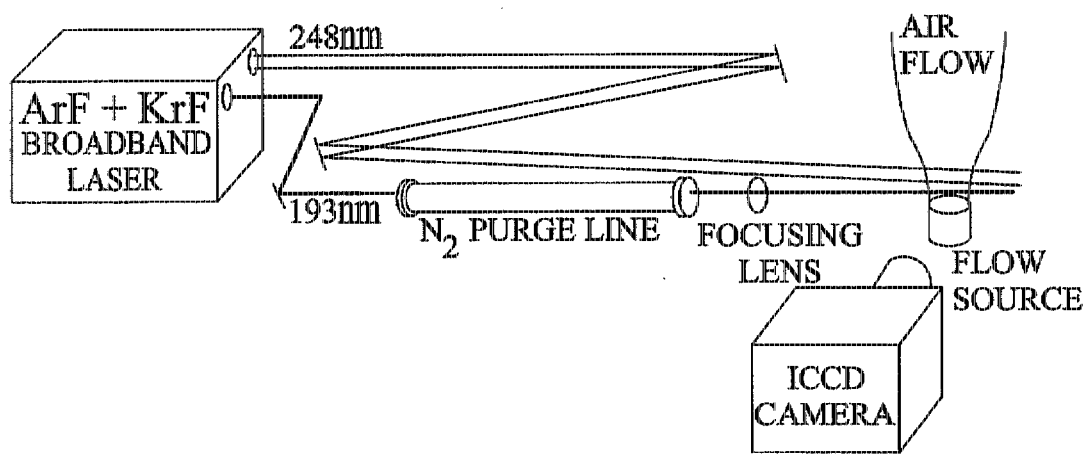
FIG. 1 depicts the optical geometry of a stable molecule tagging velocimetry system.

The method and apparatus of this invention produce a stable molecule or stable intermediate molecule within the gas flow. By "stable molecule or stable intermediate molecule", it is meant a molecule that resists the loss of excitation energy due to collisions or other interaction with particles or with other chemical species within the gas flow; or a molecule that resists degradation within the gas flow. This characteristic allows the stable molecule to travel within the gas flow for an adequate distance or for an adequate time interval so that the velocity of the flow can be determined. Since the stable molecule or stable intermediate molecule can travel in the flow for a distance or for a time interval without the loss of excitation energy or without degradation, it itself can be fluoresced or it can serve as a source for chemical species, i.e. atoms, molecules, ions, or clusters thereof, that can be targeted for fluorescence. By measuring the distance or time between production of the stable molecule and a subsequent fluorescence event, the velocity of the gas flow can be determined. Thus, once it is produced, the stable molecule or stable intermediate molecule acts as a tag within the gas flow.

As more fully described in the preferred embodiment, an example of a such a stable molecule or stable intermediate molecule is ozone. Other examples include nitric oxide (NO). Further examples would be readily apparent to one having ordinary skill in the art.

The term "chemical species" is known in the art and it is meant to refer to atoms, molecules, ions, or clusters of these species found within the gas flow. By the term "measuring the fluorescence", it is meant to include any measurement from the detection of fluorescence to the determination of the intensity of the fluorescence. The term "population" can mean one chemical specie or many chemical species. The method and apparatus of this invention can be used with gas flows that are enclosed or unenclosed. The term "chamber" is used to refer to any number of chambers or enclosures wherein the velocity of a gas flow is measured. Examples of such a chamber include wind tunnels, jet engine testing facilities, and the like.

By the term "gas flow" it is meant an air stream over an aircraft wing, jet engine exhaust or the like. Accordingly, while the experiments of the preferred embodiment were performed on a gas flow at ambient temperature, it is within the scope of this invention to measure the velocity of a gas flow that is at a temperature produced by the combustion of jet fuel.

The term "laser beam" is meant to refer to laser pulses of various optical geometries, including, but not limited to, beams, ribbons, or sheets. Accordingly, any reference to a specific beam with a specific dimension should be construed as an example of a laser beam and should not be construed as a limitation on the term "laser beam".

The following non-limiting examples are set forth to describe the several embodiments of the method and apparatus of this invention.

EXAMPLE 1

Ozone Tagging Velocimetry

Figure 2A:
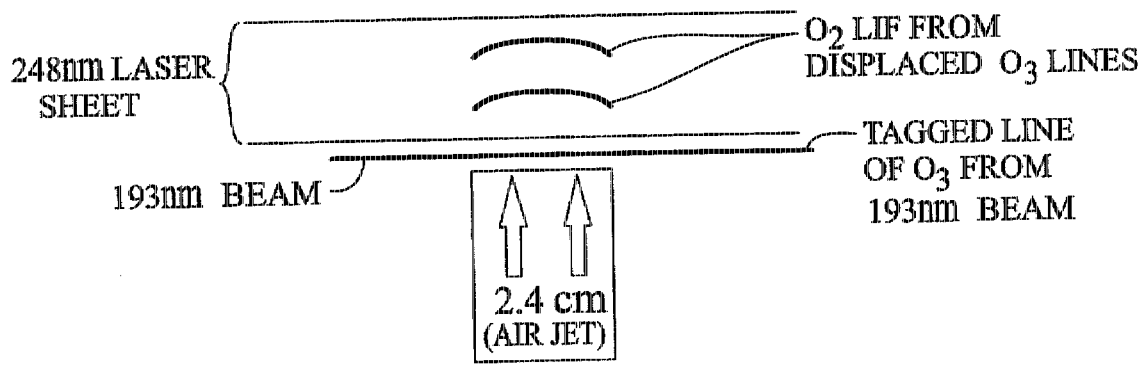
FIGS. 2a and 2b depict stable molecule tagging velocimetry in an air jet: a) schematic, and b) ICCD image.

In the preferred embodiment of this invention, an unseeded velocity method called ozone tagging velocimetry (OTV) that photo-chemicaor produces a stable velocity tag in either moist or dry air is described. The method is illustrated in FIGS. 1–3. A pulse of 193 nm light from an ArF excimer laser "writes" a line of ozone in the air flow via the reactions,[9]

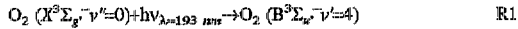  R1
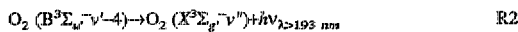  R2
  R3
  R4 where $M=O_2$ or $N_2$. The original position of the tagged line is marked by the fluorescence from the Sehumann-Runge band (reaction R2). This can be characterized as a first fluorescence event. The predissociation rate of reaction R3 is very fast ($k_3=10^{11}$ s$^{-1}$)[10] and the ozone formation rate is governed by reaction rate of R4 ($k_4=5.7\times10^{-46}$ m$^6$/s at 300K for $M=O_2$ or $N_2$).[9] At T=300K and P=1 atm, the growth time of $O_3$ would be, $$\tau_{O_3}=1/(k_4 n_{O_2} n_{N_2}) \approx 20 \text{ μs} \qquad (1)$$

where $n_i$ is the ith species number density. The lifetime of the ozone is very long (~hours).[9]

The photochemically tagged line is convected downstream and is illuminated by a sheet of KrF excimer light at a time delay of $\Delta t \geq \tau_{O_3} \approx 20$ μs. The 248 nm light photodissociates the ozone in the Hartley band (200–300 nm) by two pathways,[11,12]

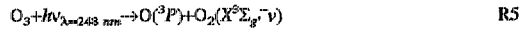  R5
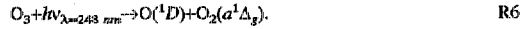  R6

About 10% of the ozone is photo-dissociated via reaction R5 that produces the vibrationally excited $O_2$ with significant populations in the v"=6,7 levels.[11] These vibrational levels are resonantly excited by the same sheet of 248 nm laser light via the $O_2$ Schumann-Runge band, $B^3\Sigma_u^-$(v'=0,2) $\leftarrow X^3\Sigma_g^-$(v"=6,7).

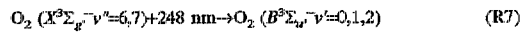  (R7)
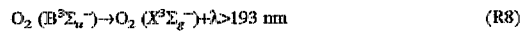  (R8)

Fluorescence from the Schumann-Runge band is imaged on a camera to "read" the final position of the tagged line. This can be characterized as a second fluorescence event.

The OTV technique is demonstrated by measuring the velocity of various air streams, or gas flows. As seen in FIG. 1, a Lambda Physik Model 160 MSC excimer laser is operated in a two-color broadband mode. One oscillator head of the laser is filled with an argon fluoride mixture producing ~35 mJ of broadband 193 nm light (13 ns pulse). The ArF beam is directed through a 1.8 m tube of pure nitrogen and is focussed by a 0.9 m cylindrical lens into a thin 0.2 mm ribbon over the top of the porous plug. The broad part of the ribbon (7 mm) is perpendicular to the flow. The ArF beam passes through a total of 2.6 m of room air that reduces the beam energy to ~15 mJ at the sample volume.

The second oscillator head of the laser is filled with a krypton fluoride mixture that produces ~200 mJ of 248 nm light (17 ns pulse). The broadband 248 nm emission is formed into a 22 mm sheet that is parallel to the direction of the air flow. The excimer laser has a single thyratron and produces the two colors simultaneously.

The Laser Induced Fluorescence (LIF) signals from the 193 nm and 248 nm laser beams are collected by a Nikon UV lens (25 mm dia.) positioned 590 mm away from the flow (f/24 light collection). A sharp cut-off liquid filter ($CCl_4$, 2 cm thick) at 280 nm eliminates the 248 nm light and an UG-11 filter blocks the room light. The image is recorded by a Princeton Instruments intensified CCD (ICCD) camera (EEV chip, 576×384 array, 22 μm×22 μm pixels, 200 ns intensifier gate). The pixels are binned 4×4 and each binned pixel images 0.70×0.70 mm$^2$ of the flow.

Figure 2B:
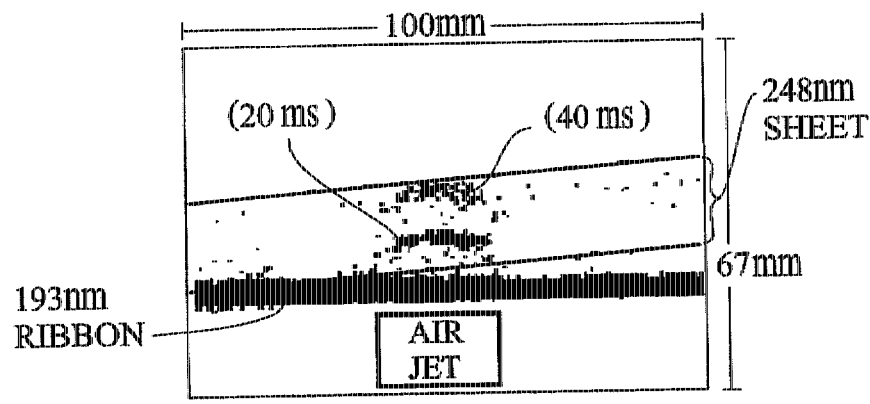

Images are recorded in an air stream produced by a round jet (24.3 mm diameter). A schematic of the jet and an OTV image are shown in FIG. 2. The jet has a series of screens in the pipe to produce a flat velocity profile. The average velocity measured by mass flow meters is 40±1 cm/s. The laser is operated at 50 Hz giving a 20 ms delay between "writing" and "reading" the ozone tag. In FIG. 2b, multiple images of the convected ozone line can be seen in an averaged (3 s) ICCD image. The lines are displaced by 13±2 binned pixels on the centerline giving a measured velocity of 45±7 cm/s.

The process of molecular diffusion broadens the ozone line. For a Gaussian line of diameter, $\omega_0$, the diameter of the line will be[13]

$$\omega = \sqrt{8\Delta t D \ln 2 + \omega_0^2} \qquad (2)$$

where D is the molecular diffusivity (for ozone, D≈0.2 cm$^2$/s) and ω is the full width at half maximum of the line. Thus a 0.2 mm thick ozone line will double in thickness in 1 ms. According to Eqn. 2, the final line after 20 ms should be about 1.5 mm thick. The line shown in FIG. 2b has a full width at half maximum of ~3 pixels or 2 mm.

Figure 3A:
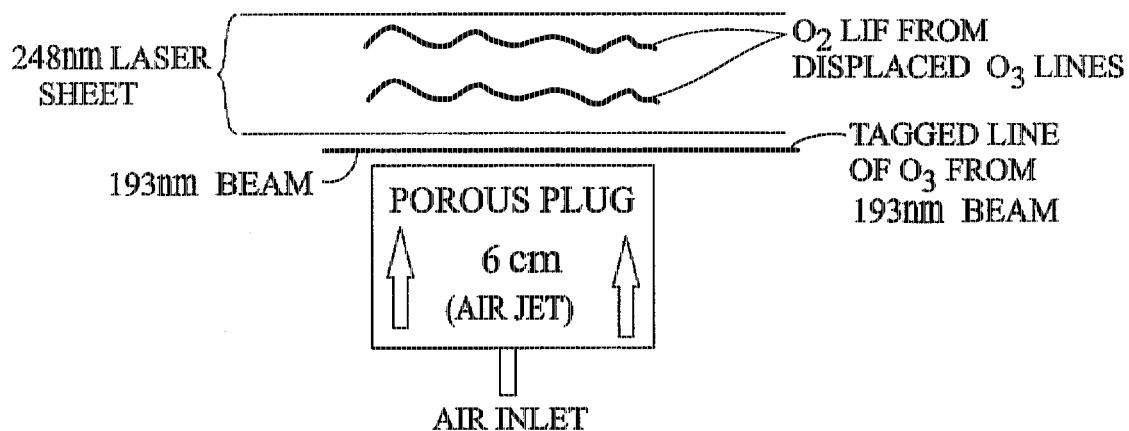
FIG. 3a and 3b depict stable molecule tagging velocimetry in a porous plug air flow: a) schematic, b) ICCD image.
Figure 3B:
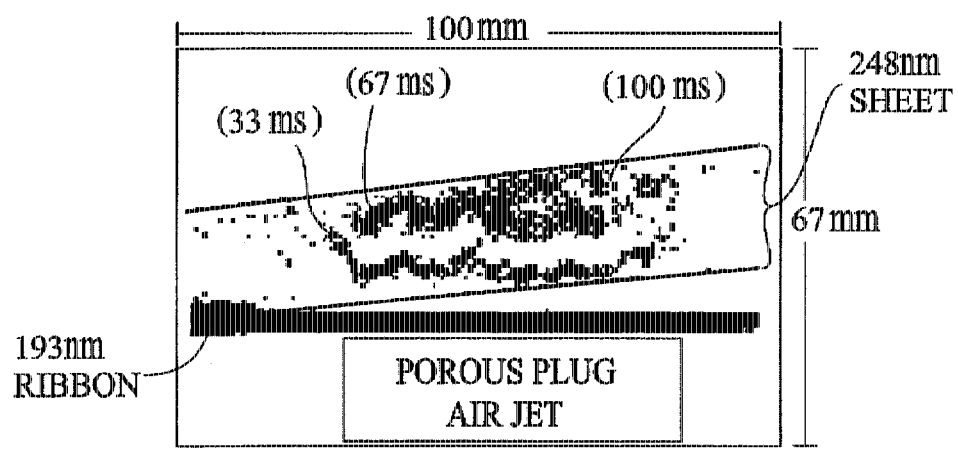

The OTV method is also demonstrated in a porous plug jet with an irregular velocity profile as sketched in FIG. 3a. The laser is operated at 30 Hz and an averaged (2.5 s) ICCD image of the lines is shown in FIG. 3b. The original line and three convected lines can be seen with a temporal spacing of 33 ms. The velocity profile is irregular but repeatable. The lines are displaced by 12±4 binned pixels giving a measured velocity of 26±9 cm/s. The average velocity at the porous plug (6 cm dia.) measured by a mass flowmeter is 27±1 cm/s.

Figure 4:
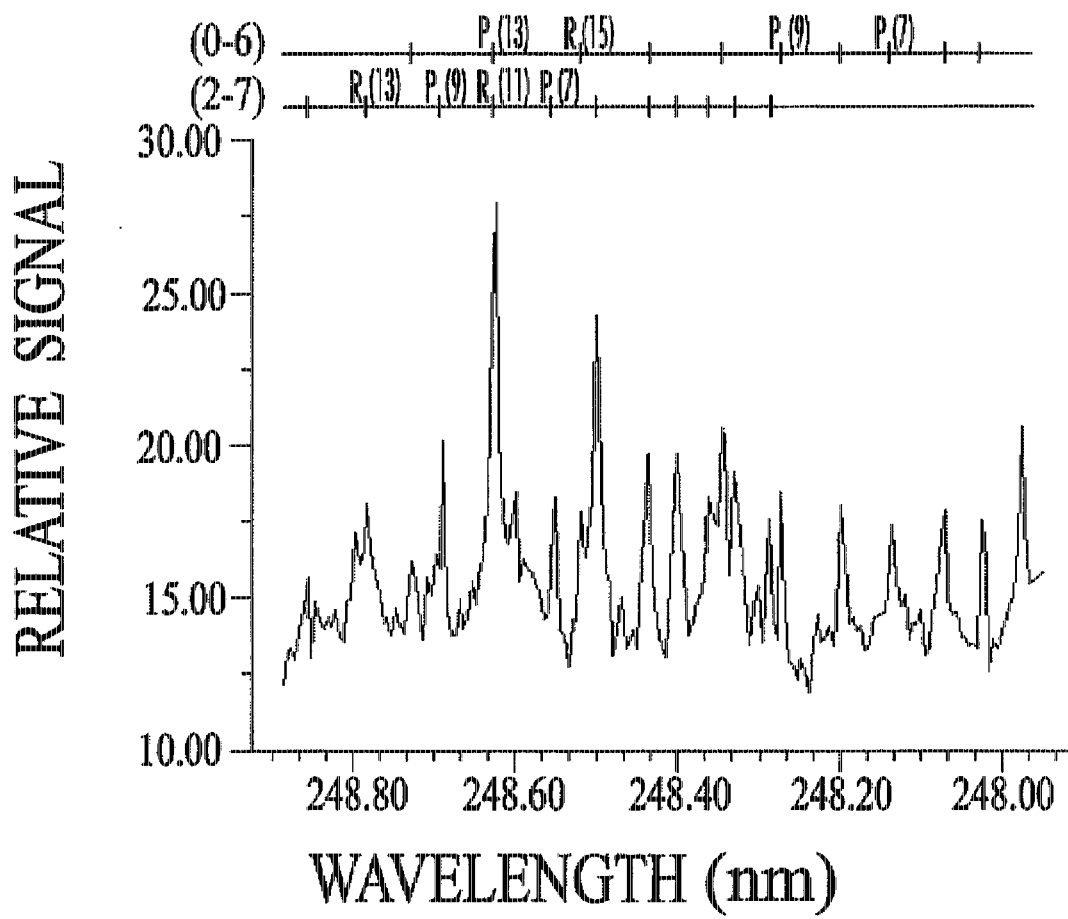
FIG. 4 depicts an excitation spectrum from room air that shows production of vibrationally hot $O_2$ $X^3\Sigma_g^-$ (v"=6,7) from 248 nm photodissociation of $O_3$.

The presence of vibrationally hot oxygen in reading the tagged line is confirmed by a laser excitation spectrum in room air. To create the ozone, a 193 nm broadband laser is focussed to 1 mm diameter beam in air (50 mJ/pulse). The output from an excimer-pumped tunable doubled dye laser (~248 nm, 0.8 mJ/pulse) is focussed to a 0.5 mm diameter beam collinear with the 193 nm beam. The fluorescence induced by the tunable dye laser is collected by a Cassegrain mirror and is detected by a photomultiplier tube (PMT). A $CCl_4$ liquid filter and an UG-11 filter are placed in front of the PMT to block the 248 nm laser and room light. The 193 nm ArF pump laser is pulsed to create ozone. A millisecond later the tunable dye laser (approximately 248 nm) photodissociates the ozone and excites $O_2$ fluorescence shown in FIG. 4. The transitions from the Schumann-Runge band are clearly identified in FIG. 4 showing the presence of vibrationally hot oxygen, $X^3\Sigma_g^-$(v"=6,7). When the 193 nm laser is blocked, the transitions completely disappear and the vibrationally hot oxygen is no longer present.

In FIGS. 2b and 3b, the fluorescence signal of the "written" line (via reaction R2) is very strong; however, the signal from the "read" line is only a few times the background level. The fluorescence signals from the written and read lines can be substantially increased by using two narrowband excimer lasers. Narrowband excimer output can be tuned to the oxygen Schumann-Runge transitions to produce more ozone in the tagged line, and more efficiently fluoresce the vibrationally hot oxygen in reading the ozone line. In this example, only about 10-20% of the laser energy is tuned to absorption lines. Also, the laser is not optimized for maximum pulse energy. New tunable narrowband excimers will produce 250 mJ/pulse at 193 nm and 450 mJ/pulse at 248 nm (The maximum pulse energy may be limited by laser-induced gas breakdown). With nitrogen or vacuum purging, 193 nm laser beam attenuation can be significantly reduced. Finally, the solid angle of light collected by the camera lens (f/24) is very small and can be increased.

Figure 14:
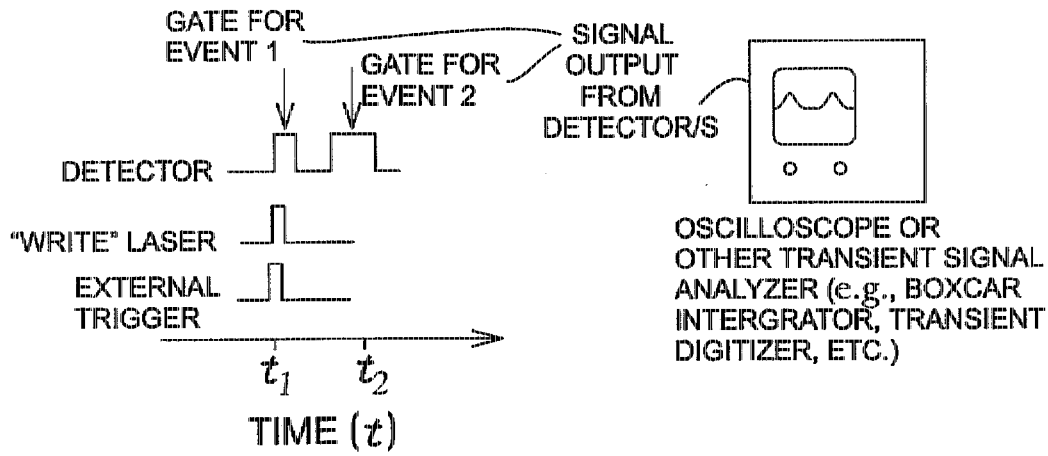
FIG. 14 is a schematic of a stable molecule tagging velocimetry system wherein distance is the fixed component of the velocity calculation and time is determined.
Figure 14:
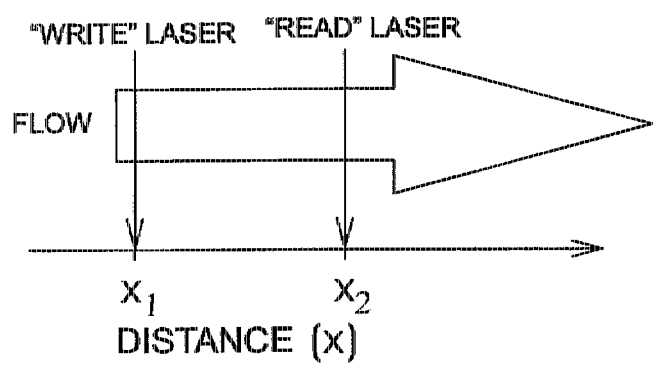

While time is characterized as the fixed component of the velocity calculation in the preferred embodiment, distance can also be fixed. See FIG. 14 for a schematic of this fixed distance system. In FIG. 14, the first laser beam (the "write" laser beam) and the second laser beam (the "read" laser beam) are set to intersect the flow at known spatial locations. An external trigger pulse is sent to the "write" laser beam to initiate the chain of events. This same initial trigger pulse also triggers (directly or indirectly) a fluorescence detector that captures the fluorescence from the first fluorescence event. This first fluorescence event marks the initial time, $t_1$. After the chain of events has been initiated at $t_1$, a delay may or may not be used to open a gate on a fluorescence detector to capture fluorescence from the second fluorescence event at a subsequent time, $t_2$. The second fluorescence event occurs as the volume of marked gas crosses the "read" laser beam. If a delay is not used, the gate width must be sufficient to capture the occurrence of the second fluorescence event. The detector may or may not be the same detector as that used to capture the first fluorescence event. Both signals from the two fluorescence events are sent to a transient signal analyzer (oscilloscope, boxcar integrator, sample and hold, transient digitizer, or the like). The displayed signal intensity is a function of time. The time is determined from the signal separation. The velocity is determined from the distance divided by the time.

While the preferred embodiment has described the use of excimer lasers, one having ordinary skill in the art would recognize that other lasers are available that can produce laser beams at the desired wavelengths.

The preferred wavelength for the first laser is 193 nanometers. However, the first fluorescence event of oxygen atoms or oxygen molecules and the production of ozone from oxygen atoms and oxygen molecules can occur over the range of wavelengths from approximately 180–220 nanometers.

The preferred embodiment describes the determination of the velocity of a gas flow along a line between the two lasers. It is possible, and within the scope of this invention, to cross two 193 nanometer laser beams to generate a point of ozone production within the flow. It is thus possible to track this point within the gas flow using the method and apparatus of this invention. The tracking of a point would provide a two-component velocity measurement and may ultimately produce more accurate velocity measurements because of increased spatial resolution.

The preferred embodiment of this invention discloses laser beams of particular wavelengths that are particularly effective in the production, photodissociation and fluorescence of ozone and oxygen molecules. Now that the production of a stable intermediate molecule, such as ozone, within the gas flow has been described in this invention, it will be apparent to those having ordinary skill in the art that other examples of stable intermediates exist. It will be equally apparent to one having ordinary skill in the art that laser beams having the appropriate wavelength for producing certain stable intermediate molecules, photodissociating these stable intermediate molecules and inducing fluorescence in the photodissociation products of the stable intermediate molecules, or in the stable molecules themselves, are also available.

Particularly, this invention's disclosure of the use of a single laser beam to photodissociate the stable intermediate molecule and induce fluorescence in the photodissociation products of the stable intermediate molecule contributes to the skilled artisan's ability to select a desired stable intermediate molecule. Accordingly, any mention of specific wavelengths should not be construed as limitations on the disclosure of this invention.

In addition to a laser beam, ozone can be produced within the gas flow by any number of means that are well known in the art. These means include, but are not limited to, means for generating an electric arc, such as an exposed electrical wire within the gas flow; an ozone generator; an ultraviolet (UV) lamp; or the like. Indeed, ozone can be seeded into the flow locally or discretely at a first location. While the process of seeding ozone locally at a first location into the flow is not in compliance with the spirit of one of the objects of this invention to provide a method of measuring the velocity of the gas flow without seeding the flow, it is within the spirit of the invention in terms of producing a population of stable molecules within the flow so that both high and low speed flows can be measured. Indeed, by the phrase "producing a population of stable molecules within the flow", it is meant to include introducing these stable molecules into the flow via localized or discrete seeding.

If the ozone is produced by means other than a first laser beam, then the desired distance or time measurements can be taken by detecting two fluorescence events produced by the second laser beam. Indeed, alternatively, additional fluorescence events produced by the second laser can be detected and used for the desired distance and time measurements as part of the preferred embodiment of this invention.

In summary, a new nonintrusive velocity method called ozone tagging velocimetry (OTV) is developed that produces a stable velocity tag without the addition of a foreign seed material. A tagged line of ozone molecules is produced photochemically by a 193 nm ArF excimer laser. Fluorescence induced by the 193 nm laser "writes" the original position of the ozone line. A sheet of light from a 248 nm KrF excimer laser "reads" the final position of the tagged line after a time delay. The 248 nm laser beam dissociates the ozone, producing vibrationally hot oxygen that is fluoresced by the same 248 nm beam. Recording the fluorescence from the initial and final lines on an ICCD camera gives the velocity component along the line. Positioning a second ICCD camera perpendicular to the first would allow measurement of orthogonal velocity components, thus effecting multi-dimensional velocimetry. The time-of-flight for the OTV method can be short or very long ($\sim$20 $\mu s \leq \Delta t \leq \sim$hours) making accurate measurement of low and high velocity flows possible.

EXAMPLE 2

Fluorescence of Oxygen Atoms

In a second stable molecule tagging velocimetry method, ozone is photodissociated by an approximately 226 nanometer laser sheet. Such a laser sheet can be generated from a XeCl excimer-pumped doubled-dye laser. This laser also accomplishes 2-photon Planar Laser Induced Fluorescence (PLIF) of the oxygen atom that is produced in the photodissociation of ozone[11,12]. The resultant emission from the 2-photon excitation of the oxygen atom is passed through a bandpass filter (Corion 850 nanometers) and detected with an intensified CCD camera, as similarly described in the preferred embodiment. Thus, it is within the scope of this invention to detect the line of tagged ozone molecules by detecting the fluorescence of oxygen atoms, in addition to the detection of oxygen molecules as described in the preferred embodiment.

EXAMPLE 3

Fluorescence of Oxygen Molecules with an Additional Laser Beam

In another embodiment of this invention, an additional laser beam can be used to induce the fluorescence of the oxygen molecules that are produced by photodissociating ozone. For example, a laser beam with a wavelength in the UV range can be used to photodissociate the ozone. The excited oxygen molecules that are produced by this photodissociation can then be fluoresced by a third laser. The third laser can be operated at, for example, a wavelength of approximately 500 nanometers (nm). There may be an occasion where the use of one laser beam to photodissociate the stable intermediate molecules followed by the use of an additional laser beam to fluoresce the chemical species produced from the stable intermediate molecules is more economically feasible. Therefore, it is within the scope of this invention to induce fluorescence in the chemical species using a third laser.

EXAMPLE 4

Optimization of Laser Bandwidths

Modern excimer lasers are capable of operating in one of two modes: either fixed wavelength and broadband, or tunable wavelength and narrowband. Since the absorption features are structured, operation in the broadband mode wastes laser pulse energy. Through the use of two narrowband tunable excimer lasers, the following the improvement can be expected.

A first order calculation for the level of improvement in signal by implementing narrowband lasers may be gathered by modeling the spectral overlap between the transition lineshapes and the laser lineshapes. Table I lists the bandwidth and linewidth information used in this analysis.

TABLE I

Linewidth and bandwidth information for lineshape overlap analysis.

| Parameter (FWHM) | Broadband ($cm^{-1}$) | Narrowband ($cm^{-1}$) |
|---|---|---|
| ArF Laser Bandwidth[14] | 135 | 0.81 |
| KrF Laser Bandwidth[14] | 67 | 0.81 |
| $O_2$ (4, 0) Transition Width P-Branch[15] | 6.7 | 6.7 |
| $O_2$ (0 6), (1, 6), (2, 7) Transition Width P and R-Branch | 1–2 | 1–2 |

Figure 5:
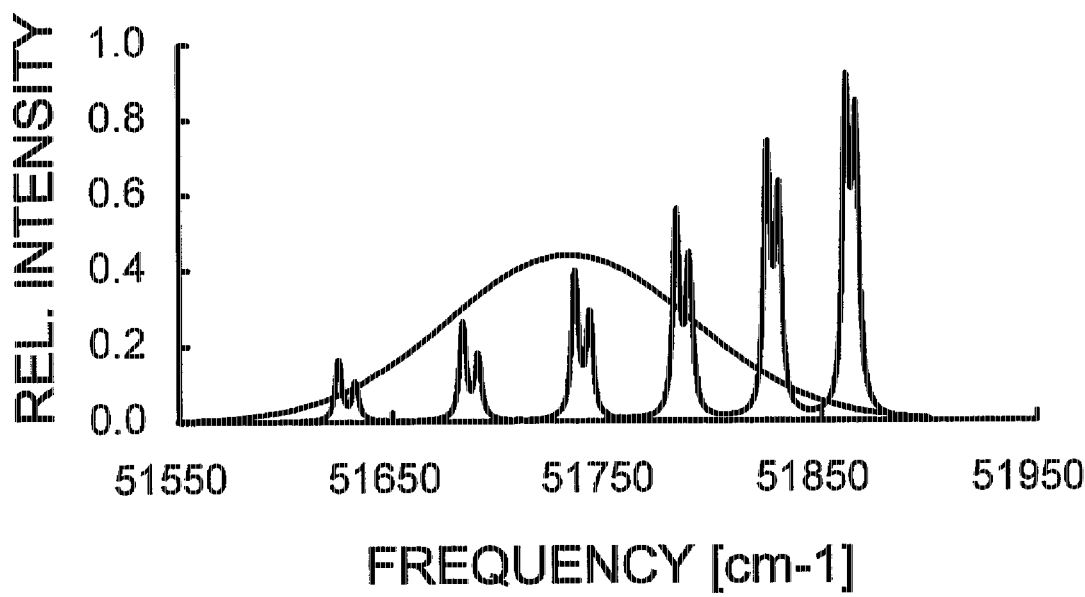
FIG. 5 depicts superposition of the $O_2$ (4,0) band with broadband ArF laser output.
Figure 6:
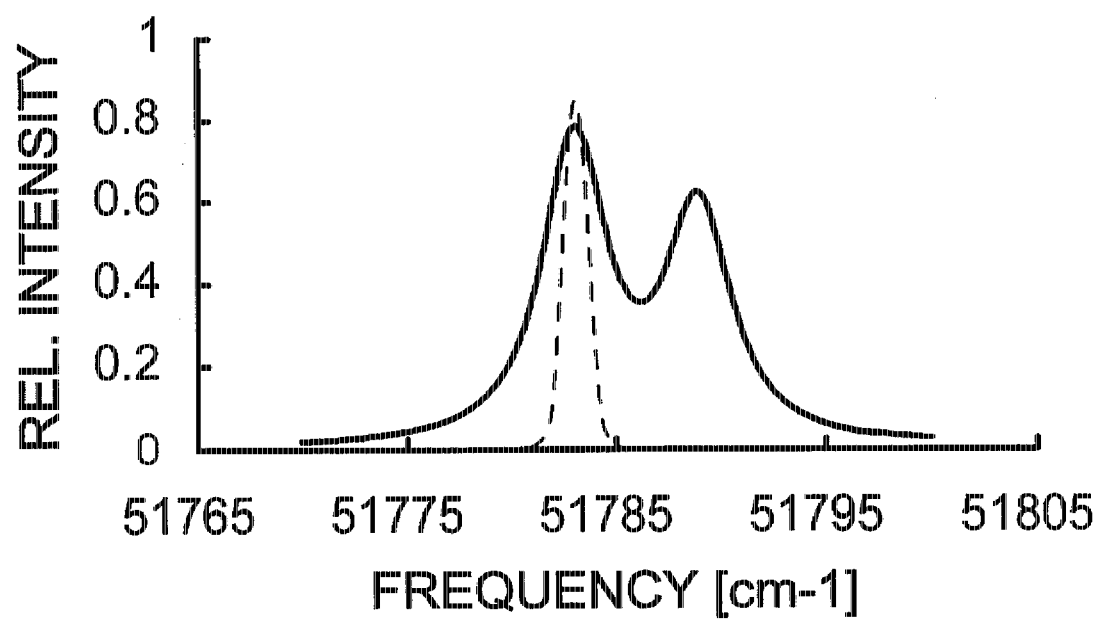
FIG. 6 depicts superposition of the P(15)R(17) blended feature of the $O_2$ (4,0) band with the narrowband ArF laser output.

In the limit of negligible absorption from $O_2$, the improvement in going from broadband ArF to narrowband ArF by convoluting the laser lineshape with the spectrum of the $O_2$ Schumann-Runge (4,0) band system is determined. Superimposed on the simulated Schumann-Runge (4,0) band of $O_2$ at room temperature and 1 atm pressure in FIG. 5 is the broadband ArF laser output. It is clear from this figure that much of the laser energy is not utilized, and that converting the laser to narrowband tunable operation will improve the amount of ozone photochemically created through reactions R1–R4. To calculate this improvement, the convolution of the $O_2$ absorption spectrum with broadband ArF laser output must be compared to the convolution of the absorption spectrum with the narrowband output. FIG. 6 shows the superposition of the ArF narrowband output with the P(15) R(17) blended rotational absorption feature of the (4,0) Schumann-Runge $O_2$ band.

An estimate of the respective overlap integrals was based on approximate lineshapes. The ratio of the integrated product of the normalized absorption and ArF broadband output spectra to the integrated product of the normalized absorption and narrowband ArF yields a factor of approximately three improvement.

Figure 7:
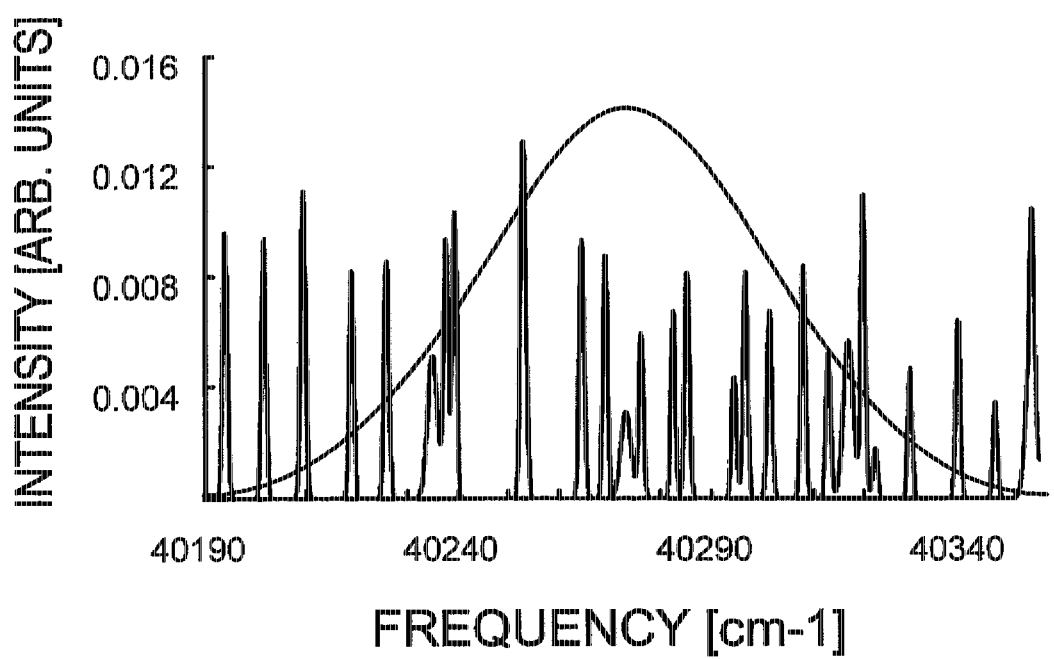
FIG. 7 depicts superposition of the Schumann-Runge (0,6), (1,6), (2,7) absorption band of $O_2$ at 300K and 1 atm with the broadband KrF laser output.
Figure 8:
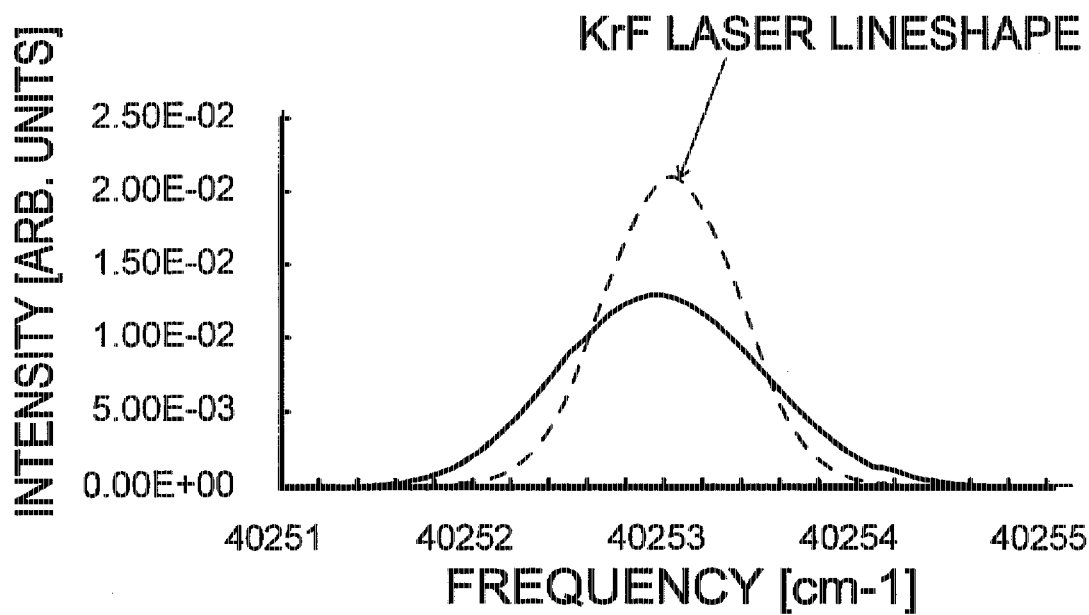
FIG. 8 depicts superposition of the Schumann-Runge (0,6) P(13): (2,7) R(11) combination absorption band of $O_2$ at 300K and 1 atm with the narrowband KrF laser output.

Improvement is also expected for switching from broadband KrF to narrowband KrF operation for the "reading" step in the OTV process. A similar lineshape—overlap analysis was performed for the case of the KrF interrogation laser. FIG. 7 shows the superposition of the simulated fluorescence excitation spectrum of the $O_2$ Schumann-Runge spectrum with the broadband output of the KrF laser. Again it is clear that much of the laser energy is not being utilized and that narrowband operation should improve the OTV detection capabilities by enhancing the LIF interrogation of the vibrationally excited $O_2$ photoproduct through reactions R7 and R8. FIG. 8 shows the overlap between the narrowband KrF output and the (0,6), (1,6), (2,7) absorption bands of $O_2$. The ratio of the integrated convolution of the normalized absorption and KrF broadband output spectra to the integrated convolution with the narrowband KrF yields approximately a factor of seven improvement.

EXAMPLE 5

Degree of Laser Pulse Energy Attenuation in the Preferred Embodiment

Figure 9:
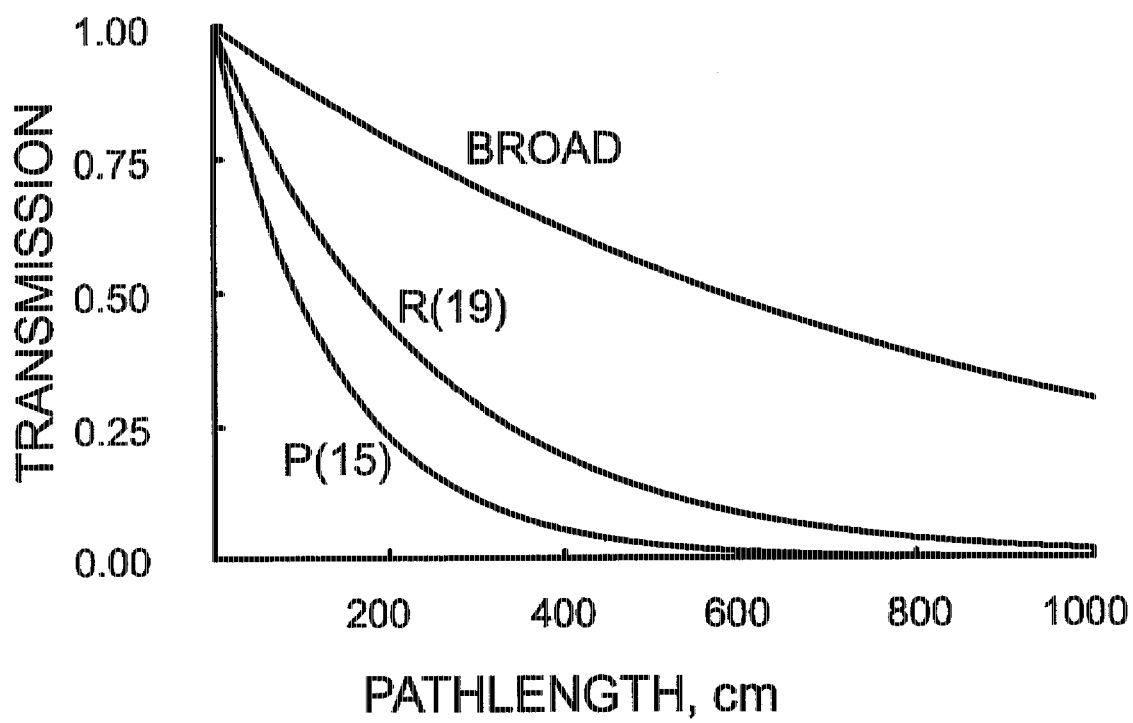
FIG. 9 is a transmission plot versus propagation distance for three cases of 193 nm excitation of the (4,0) Schumann-Runge band of $O_2$ in room air.

The second issue investigated was the degree of laser pulse energy attenuation in the 193 nm region. At 300K and 1 atm, the transmission of the broadband pulse is reduced by the inverse amount that the LIF signal is increased when using the narrowband pulse. The absorption coefficient for the P(15) (4,0) line is 0.00941 $cm^{-1}$, and 0.00489 $cm^{-1}$ for the R(19) (4,0) line for narrowband excitation. For broadband excitation, the absorption coefficient is 0.0021 $cm^{-1}$. FIG. 9 is a plot of 193 nm beam transmission versus pathlength in room air. Such a plot is useful as a rule-of-thumb to guide experimental configurations, and serves to underscore the importance of using $N_2$ purge lines to isolate the 193 nm beam from ambient $O_2$. Note that nearly all the pulse energy will be absorbed for the P(15) and R(19) lines after propagating approximately 4 m.

Due to the strong attenuation from ambient $O_2$, especially over large distances, there may be some situations where tuning the laser to line center is not advisable and that a better approach would be to tune off the central absorption maximum. To examine this, ozone production with a narrowband ArF laser as a function of detuning from the P(15) line and of position over a 12 foot propagation path was calculated. The P(15) R(17) pair were chosen because they are relatively strong and close to the maximum gain curve for ArF. The two lines were then modeled with a Lorentzian lineshape of 6.7 $cm^{-1}$ FWHM resulting in a partially resolved doublet lineshape. The doublet lineshape feature was then convoluted with the laser lineshape, a Gaussian of 0.81 cm$^{-1}$ FWHM, to give the effective absorptivity that the laser would experience at any given wavelength. Since the laser is significantly narrower than the molecular feature, this convolution does not change the appearance of the $O_2$ absorption feature appreciably. Given the absorptivity of the oxygen as a function of wavelength, the laser intensity for any wavelength at any point along the propagation can be determined; however, what is more important is how these parameters affect how much ozone is created in a given probe volume. The amount of ozone created is directly proportional to the loss of UV intensity over the probe region due to $O_2$ absorption. For this calculation, a 10 cm long probe region was chosen.

Figure 10:
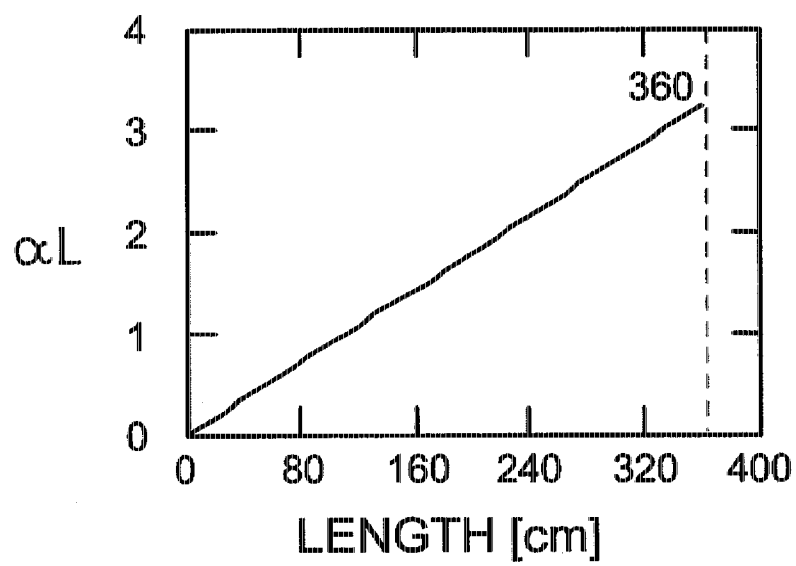
FIG. 10 is a plot of the product $\alpha \cdot L$ versus propagation distance L (cm).
Figure 11:
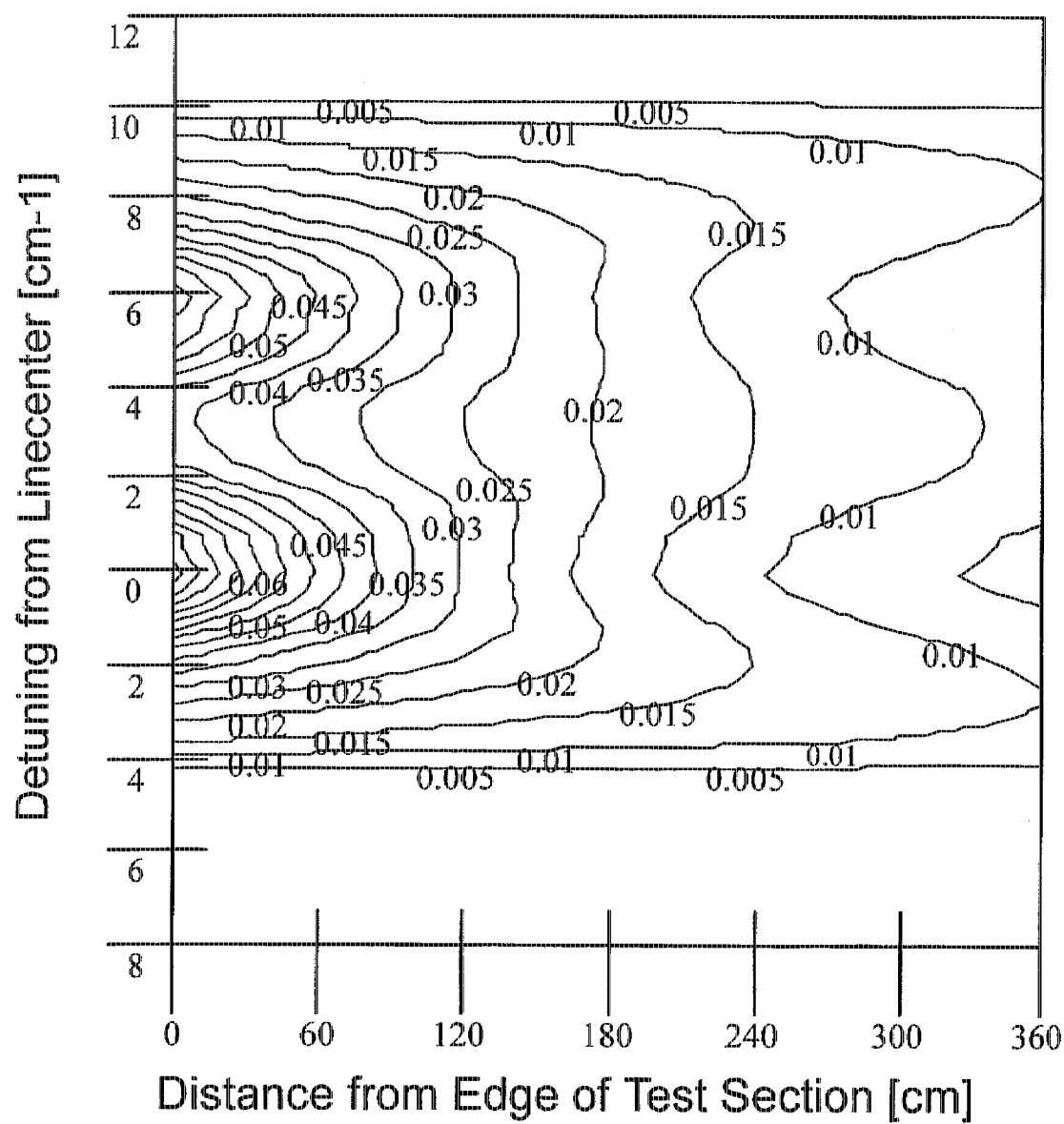
FIG. 11 is a 3-D contour plot indicating the degree of $O_3$ production over the 10 cm probe interval for each frequency and distance from the edge of the theoretical test section.

The analysis shows for each frequency and distance from the edge of the test section how much light is lost over the following 10 cm probe volume. In regions close to the edge of the theoretical test section, the highest flux of photons to the probe volume is delivered by tuning to the maximum absorption, i.e., the center of the P(15) line. As the distance to the probe volume increases, however, the light lost before reaching the probe volume becomes too high and it becomes more advantageous to tune off the maximum absorbance (or tune to a less absorbing feature). For the P(15) line, this point of diminishing returns occurs at roughly 120 cm (4 ft), which is where $\alpha \cdot L$ reaches unity when the laser is at the P(15) linecenter, as shown in FIG. 10. Note that $\alpha \cdot L$ is unitless since L is in cm, and $\alpha$ (cm$^{-1}$) is the product of the absorption cross section (cm$^2$/molecule) and the number density (molecules/cm$^3$). FIG. 11 is a 3-D contour plot depicting how much light is lost over the following 10 cm interval for each frequency and distance from the edge of the theoretical test section.

EXAMPLE 6

Time Scales for the Production of Ozone in the Preferred Embodiment

A third issue investigated was the assessment of the relevant time scales in the OTV process. Of particular interest is how fast ozone formed, and what is its lifetime. These times dictate the velocity range spanned by the OTV technique. First, we estimate the characteristic growth time for ozone in the tagged volume. Since reaction R4 has the smallest rate constant for the writing step in the OTV process[10], it is the rate limiting step. Given sufficient laser fluence, reaction R4 will govern the growth of ozone, and therefore, the characteristic growth time for ozone formation is estimated by inversion of the second order rate expression, $$\tau_{O_3} = \frac{1}{k_4 n_{O_2} n_{N_2}}, \quad (1)$$

where $n_i$ is the steady state number density for the colliding partners $N_2$ and $O_2$. For conditions at room temperature and atmospheric pressure, the steady state number densities of the colliders $O_2$ and $N_2$ are approximately $4.95 \times 10^{18}$ molecules cm$^{-3}$ and $1.92 \times 10^{19}$ molecules cm$^{-3}$, respectively. From equation (1) a characteristic growth time under these conditions of approximately 20 μs is calculated.

Although the kinetics dictate that ozone exhibits a finite period for growth, this time does not necessarily limit the OTV measurement. The initial time marking the event is not dependent on the presence of ozone, but on the precise recording of the time initiating the ozone producing photochemistry. Once the photochemistry is initiated, reaction proceeds within the volume of gas undergoing displacement in the flow. For a very high speed flow with limited spatial dimension, the 20 μs time could conceivably be restrictive; however, an example of a flow traveling at Mach 5 serves to put this in perspective. A Mach 5 flow would require only 3.5 cm time-of-flight displacement before the 248 nm interrogation laser sheet could be used to effectively read the markers.

As in all chemical reactions, product growth is in direct competition with product loss. Unlike other molecular velocimetry methods, OTV is relatively immune from the presence of water vapor. As noted in the literature describing ozone loss mechanisms in air, ozone exhibits no appreciable reactivity with water vapor[16]. The dominant chemical loss mechanisms for ozone in the troposphere is the bimolecular reaction[17]

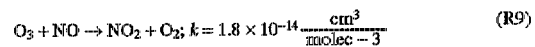

$$O_3 + NO \rightarrow NO_2 + O_2; k = 1.8 \times 10^{-14} \frac{cm^3}{molec-3} \quad (R9)$$

An estimate for the number density of NO in a heavily polluted environment is 100 ppm ($2.46 \times 10^{16}$ molec cm$^{-3}$). The estimated number density for ozone is $1.25 \times 10^{14}$ molec cm$^{-3}$. Based on reaction R9 as the dominant loss mechanism, a chemical lifetime for ozone of approximately 2 hours is calculated. The 2 hour chemical lifetime is several orders of magnitude larger than the molecular diffusional lifetime, and therefore the limit on ozone loss for these flows will be dictated by molecular diffusion instead of kinetics.

Figure 12:
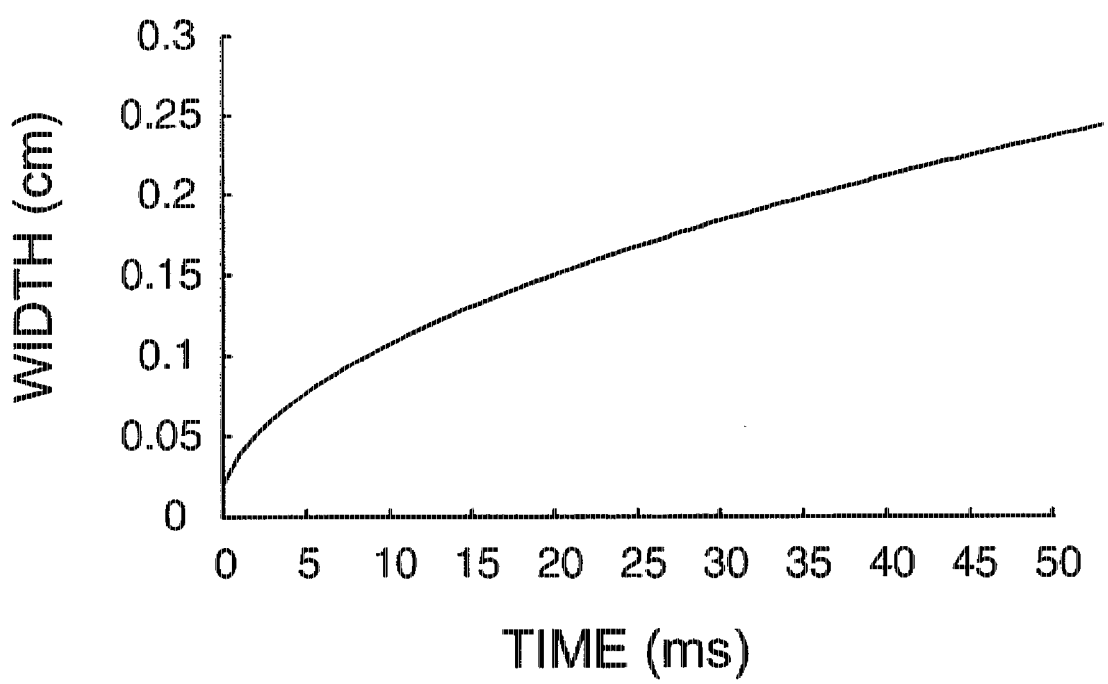
FIG. 12 depicts full width half maximum of the ozone line as a function of time.

From these results, the measured full width, half maximum of the displaced ozone line was approximately 3 pixels (2 mm) which corresponds to the predicted diffusion broadening expected for ozone in 25 ms. For a Gaussian line of diameter $\omega_0$, the diameter of the line as a function of molecular diffusion is[13]

$$\omega = \sqrt{8 \Delta t D \ln 2 + \omega_0^2}, \quad (2)$$

where $\Delta t$ is the time constant, D is the molecular diffusivity ($D(O_3) \approx 0.2$ cm$^2$ s$^{-1}$) and $\omega$ is the full width at half maximum of the line. The full width at half maximum of the line is plotted in FIG. 12 as a function of time. A 0.2 mm thick ozone line will double in thickness in approximately 1 ms. After 50 ms, the predicted width of the ozone line will be approximately 2 mm thick, which agrees well with the observation.

EXAMPLE 7

Extrapolation of the Preferred Embodiment to Larger Scale Environments

Figure 13:
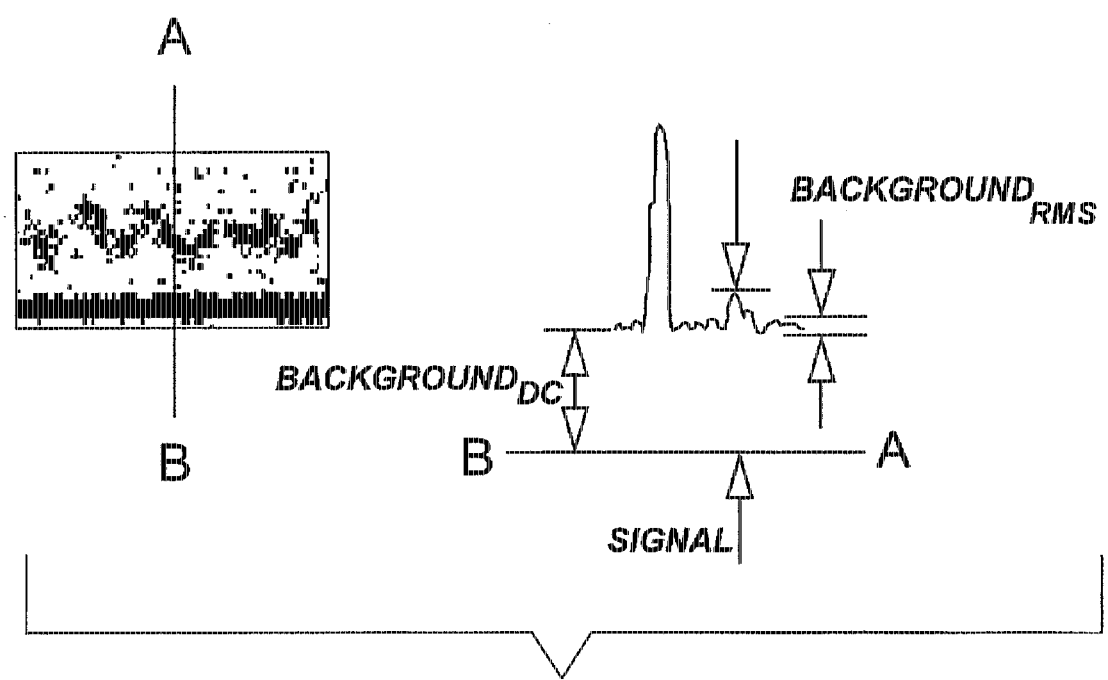
FIG. 13 is a schematic cross section of an OTV image used to define the relevant terms in the contrast ratio.

The fourth issue under consideration was: how practical is the OTV method based on extrapolating the laboratory measurements to larger scale environments such as engine test stands? The contrast ratio of the ozone "read" line was adopted as the figure-of-merit for estimating the level of performance over the laboratory OTV breadboard. The contrast ratio, $C_R$, of the ozone line is defined as $$C_R = \frac{Signal - Background_{DC}}{Background_{RMS}},$$

where the relevant terms in this definition are depicted in the schematic cross section of FIG. 13.

As an example, a calculation of the contrast ratio for the 600 shot average OTV image was made and is shown in FIG. 13. For this image, the contrast ratio is approximately 2.5. For precise single-shot velocity measurements, OTV images will require contrast ratios of 10 or better. Since the contrast ratio is proportional to the square root of the number of laser shots, the required level of signal improvement must be approximately two orders of magnitude, $$\text{Needed Signal Improvement} = 4 \cdot \sqrt{600} \approx 100.$$

Table II compares experimental parameters between the OTV breadboard assembly and a generic, large scale, test section and lists the expected signal improvement. Although an upper limit to pulse energies based on currently available excimer laser output is listed, for this analysis the more conservative values of the specifications for the lasers used in the Vanderbilt University laboratory are adopted.

TABLE II

Experimental Parameters for OTV Breadboard & Generic Large Scale Test Section.

| Parameter | OTV Breadboard | Generic Test Section | Improvement Factor |
|---|---|---|---|
| Collection Optics (F/#) | 24 | 6 ft/6 in = 12 | ×4 |
| ArF Laser Pulse Energy (mJ/pulse) | 30 | 100 to 400 (upper limit with new laser) | ×3.3 to 13 |
| KrF Laser Pulse Energy (mJ/pulse) | 70 | 250 to 800 (upper limit with new laser) | ×3.5 to 11 |
| Pulses Averaged | 600 | 1 | 1/√600 |

In addition to improvements expected from using newer laser systems and faster collection optics assemblies, improvement is also expected by operating both of the lasers in the narrowband tunable mode, in effect, improving the overlap between the transition lineshape and the laser lineshape.

Total estimated signal improvement in OTV measurements extrapolated from the OTV breadboard to generic large scale test sections takes into account single-shot operation and improvements in light collection, laser pulse energies, and laser-transition line overlap. In combination, the product of these factors predicts almost three orders of magnitude signal improvement. These factors are summarized in Table III and compared to the estimated required signal improvement.

TABLE III

Summary of Signal Improvement Sources and Comparison with Signal Improvement Requirement.

| Source of Improvement | Improvement Factor |
|---|---|
| Collection Optics | 4 |
| ArF Pulse Energy | 3.3 |
| KrF Pulse Energy | 3.4 |
| ArF Narrowband Operation | 3 |
| KrF Narrowband Operation | 7 |
| Total Improvement Expected | ~942 |
| Improvement Required | 100 |
| Margin of Safety | 9 × |

REFERENCES

1. L. E. Drain, *The Laser Doppler Technique* (Wiley, N.Y., 1980).
2. R. L. McKenzie, in *Digest of AIAA 33rd Aerospace Sciences Meeting* (American Institute of Aeronautics and Astronautics, Washington, 1995) paper 95-0297.
3. R. J. Adrian, Annu. Rev. Fluid Mech. 23, 261 (1991).
4. K. G. Klavuhn, G. Gauba, and J. C. McDaniel, J. Propuls. Power 10, 787 (1994).
5. R. Miles and W. Lempert, Appl. Phys. B 51, 1 (1990).
6. R. Miles, C. Cohen, J. Connors, P. Howard, S. Huang, E. Markovitz, and G. Russell, Opt. Lett. 12, 861 (1987).
7. R. B. Miles, J. J. Connors, E. C. Markovitz, P. J. Howard, and G. J. Roth, Exp. Fluids 8, 17 (1989).
8. L. R. Boedeker, Opt. Lett. 14, 473 (1989).
9. B. Freisinger, U. Kogelschatz, J. H. Schäifer, J. Uhlenbusch, and W. Viöl, Appl. Phys. B 49, 121 (1989).
10. G. Laufer, R. L. McKenzie, and D. G. Fletcher, Appl. Opt. 29, 4873 (1990).
11. H. Park and T. G. Slanger, J. Chem. Phys. 100, 287 (1994).
12. R. L. Miller, A. G. Suits, P. L. Houston, R. Toumi, J. A. Mack, A. M. Wodtke, Science 263, 1831 (1994)
13. R. Miles, W. Lempert, and B. Zhang, Fluids Dynamics Research 8, 9 (1991).
14. Lambda Physik, Inc., 289 Great Road, Acton, Mass. 01720
15. A. S. C. Cheung, K. Yoshino, W. H. Parkinson, and D. E. Freeman, J. Chem. Phys., 92, 42 (1990).
16. A. Lopez, M. L. Huertas, and J. M. Lacome, Journ. Geophys. Res. 97, 6149 (1992).
17. J. A. Logan, M. J. Prather, S. C. Wofsy, and M. B. McElroy, Journ. Geophys. Res. 86, 7210 (1981).

Thus, although there have been described particular embodiments of the present invention of a new and useful Method and Apparatus for Determining the Velocity of a Gas Flow, it is not intended that such references be construed as limitations upon the scope of this invention except as set forth in the following claims. Further, although there have been described certain operating parameters and dimensions used in the preferred embodiment, it is not intended that such operating parameters and dimensions be construed as limitations upon the scope of this invention except as set forth in the following claims.

What is claimed is:

1. A method of measuring velocity of a gas flow, the method comprising the steps of:
   a. producing a population of stable molecules within the flow at a first location at a first time point;
   b. producing a population of excited chemical species within the flow by exciting the stable molecules;
   c. inducing fluorescence in the population of excited chemical species at a second time point;
   d. detecting a fluorescence event of the population of excited chemical species at a second location at the second time point; and
   e. calculating the velocity of the gas flow by dividing a distance between the first and second locations by an amount of time elapsed between the first and second time points.

2. The method according to claim 1 wherein the step of producing a population of excited chemical species within the flow by exciting the stable molecules is performed with a first laser beam and the step of inducing fluorescence in the population of excited chemical species at the second time point is performed with a second laser beam.

3. The method according to claim 1 wherein the steps of producing a population of excited chemical species within the flow by exciting the stable molecules and inducing fluorescence in the population of excited chemical species are performed with a single laser beam.

4. The method according to claim 1 wherein the second time point occurs at a known time interval from the first time point.

5. The method according to claim 1 further comprising the steps of repeating steps (b) and (c); detecting an additional fluorescence event of the population of excited chemical species at a third location within the flow at a third time point; and calculating the velocity of the gas flow by dividing a distance between the second and third locations by an amount of time elapsed between the second and third time points.

6. The method according to claim 1 wherein the stable molecule is ozone.

7. The method according to claim 4 further comprising repeating steps (a) through (d) of the method to generate multiple distance measurements; averaging the multiple distance measurements; and calculating the velocity of the gas flow by dividing the average distance by the known time interval.

8. The method according to claim 6 wherein the population of excited chemical species comprises oxygen molecules.

9. The method according to claim 6 wherein the population of excited chemical species comprises oxygen atoms.

10. A method of measuring velocity of a gas flow, the method comprising the steps of:
   a. exciting a first population of chemical species within the flow with a first laser beam to induce fluorescence and to produce a first population of excited chemical species and producing stable intermediate molecules from the first population of excited chemical species with the first laser beam;
   b. obtaining a location of the first population of excited chemical species by detecting the fluorescence of the first population of excited chemical species at a first time point;
   c. producing a second population of excited chemical species by exciting the stable intermediate molecules with a second laser beam at a second time point;
   d. inducing fluorescence in the second population of excited chemical species with the second laser beam at the second time point;
   e. obtaining a location of the second population of excited chemical species by detecting the fluorescence of the second population of excited chemical species at the second time point,
   f. determining a distance between the location of the first population of excited molecules and the location of the second population of excited molecules and determining an amount of time elapsed between the first and second time points; and
   g. calculating the velocity of the gas flow by dividing the distance between the location of the first population of excited molecules and the location of the second population of excited molecules by the amount of time elapsed between the first and second time points.

11. The method according to claim 10 wherein the second time point occurs at a known time interval from the first time point.

12. The method according to claim 11 further comprising repeating steps (a) through (f) of the method to generate multiple distance measurements; averaging the multiple distance measurements; and calculating the velocity of the gas flow by dividing the average distance by the known time interval.

13. The method according to claim 11 wherein the first and second time points are established by firing the first and second laser beams into the flow on a cycle based on the known time interval.

14. The method according to claim 11 wherein the known time interval is a fixed interval.

15. The method according to claim 10 wherein the stable intermediate molecule is ozone.

16. The method according to claim 15 wherein the population of excited chemical species comprises oxygen molecules.

17. The method according to claim 15 wherein the population of excited chemical species comprising oxygen atoms.

18. The method according to claim 15 wherein the first laser beam has a wavelength of about 193 nm.

19. The method according to claim 15 wherein the second laser beam has a wavelength of about 248 nm.

20. The method according to claim 15 wherein the second laser beam has a wavelength of about 226 nm.

21. A method for determining the velocity of an gas flow comprising the steps of:
   a. exciting a first population of oxygen chemical species within the flow with a first laser beam to induce fluorescence and to produce a first population of excited oxygen chemical species;
   b. obtaining a location of the first population of excited oxygen chemical species within the flow by detecting the fluorescence of the first population of excited oxygen chemical species at a first time point;
   c. producing ozone molecules from the first population of excited oxygen chemical species;
   d. producing a second population of excited oxygen chemical species by exciting the ozone molecules with a second laser beam at a second time point;
   e. inducing fluorescence in the second population of excited oxygen chemical species with the second laser beam at the second time point;
   f. obtaining a location of the second population of excited oxygen chemical species within the flow by detecting the fluorescence of the second population of excited oxygen chemical species at the second time point; and
   g. calculating the velocity of the gas flow by dividing a distance between the location of the first population of excited oxygen chemical species and the location of the second population of excited oxygen chemical species by an amount of time elapsed between the first and second time points.

22. The method according to claim 21 wherein the second population of excited oxygen chemical species comprises oxygen molecules.

23. The method according to claim 21 wherein the second population of excited oxygen chemical species comprises oxygen atoms.

24. The method according to claim 21 wherein the first laser beam has a wavelength of about 193 nm.

25. The method according to claim 21 wherein the second laser beam has a wavelength of about 248 nm.

26. The method according to claim 21 wherein the second laser beam has a wavelength of about 226 nm.

27. The method according to claim 21 wherein the second time point occurs at a known time interval from the first time point.

28. The method according to claim 27 further comprising repeating steps (a) through (f) of the method to generate multiple distance measurements; averaging the multiple distance measurements; and calculating the velocity of the gas flow by dividing the average distance by the known time interval.

29. The method according to claim 27 wherein the first and second time points are established by firing the first and second laser beams into the flow on a cycle based on the known time interval.

30. The method according to claim 27 wherein the known time interval is a fixed interval.

31. Apparatus for measuring velocity of a gas flow, the apparatus comprising:
   a. means for producing a population of stable molecules at a first location within the flow at a first time point;
   b. means for producing a population of excited chemical species in the flow by exciting the stable molecules;
   c. means for inducing fluorescence in the population of excited chemical species at a second location at a second time point;
   d. means for detecting a fluorescence event of the population of excited chemical species at the second location at the second time point.

32. The apparatus according to claim 31 further comprising means for calculating the velocity of the gas flow by dividing the distance between the first and second locations by an amount of time elapsed between the first and second time points.

33. The apparatus according to claim 31 wherein the means for producing a population of stable molecules within the flow comprise a laser beam generating means, means for producing an electrical arc, an ultraviolet lamp, or an ozone generator.

34. The apparatus according to claim 31 wherein the means for producing a population of excited chemical species in the flow by exciting the stable molecules and the means for inducing fluorescence in the population of excited chemical species at a second time point comprise the same means.

35. The apparatus according to claim 31 wherein the means for producing a population of excited chemical species in the flow by exciting the stable molecules comprise laser beam generating means.

36. The apparatus according to claim 31 wherein the means for inducing fluorescence in the population of excited chemical species at a second time point comprise laser beam generating means.

37. The apparatus according to claim 31 further including means for establishing the amount of time elapsed between the first and second time points as a fixed interval.

38. The apparatus according to claim 34 wherein the means for producing a population of excited chemical species in the flow by exciting the stable molecules and the means for inducing fluorescence in the population of excited chemical species at a second time point comprise laser beam generating means.

39. The apparatus according to claim 38 wherein the laser beam generated by the laser beam generating means has a wavelength of about 248 nm.

40. Apparatus for measuring velocity of a gas flow, the apparatus comprising:
   a. means for producing a first laser beam of a first wavelength at a first location within the flow, the first laser beam exciting a first population of chemical species within the flow, inducing fluorescence in the first population of excited chemical species, and producing stable intermediate molecules from the first population of excited chemical species;
   b. means for producing a second laser beam of a second wavelength at a second location within the flow at a second time point, the second location lying downstream in the flow from the first location, the second laser beam producing a second population of excited chemical species by exciting the stable intermediate molecules at the second time point, inducing fluorescence in the second population of excited chemical species at the second location at the second time point; and
   c. means for detecting fluorescence of the first and second populations of excited chemical species at the first and second locations at the first and second time points, the detecting means oriented relative to the flow such that the detecting means observes the intersection of the first laser beam with the flow and intersection of the second laser beam with the flow.

41. The apparatus according to claim 40 further comprising means for calculating the velocity of the gas flow by dividing the distance travelled between the first and second time points by an amount of time elapsed between the first and second time points.

42. The apparatus according to claim 40 further comprising means for establishing the first and second time points by firing the first and second laser beams into the flow on a cycle based on a known time interval.

43. The apparatus according to claim 42 further including means for establishing the known time interval as a fixed interval.

44. The apparatus according to claim 40 wherein the first laser beam has a wavelength of about 193 nm.

45. The apparatus according to claim 40 wherein the second laser beam has a wavelength of about 248 nm.

46. A method of measuring velocity of a gas flow, the method comprising the steps of:
   a. producing a population of stable molecules within the flow at a first location at a first time point;
   b. inducing fluorescence in the population of stable molecules at a second time point;
   c. detecting a fluorescence event of the population of stable molecules at a second location at the second time point; and
   d. calculating the velocity of the gas flow by dividing a distance between the first and second locations by an amount of time elapsed between the first and second time points.

47. A method of measuring velocity of a gas flow, the method comprising the steps of:
   a. producing a population of stable molecules within the flow at a first location at a first time point;
   b. inducing fluorescence in the population of stable molecules at a second time point;
   c. detecting a fluorescence event of the population of stable molecules at a second location at the second time point;
   d. determining a distance between the first location and the second location and determining an amount of time elapsed between the first and second time points; and
   e. calculating the velocity of the gas flow by dividing a distance between the first and second locations by an amount of time elapsed between the first and second time points.

* * * * *